United States Patent [19]
Freedenberg et al.

[11] Patent Number: 5,530,595
[45] Date of Patent: Jun. 25, 1996

[54] VARIABLE FOCUS COLOR CORRECTED FIELD LENS

[75] Inventors: Candace J. Freedenberg, Holly Ridge, N.C.; Frederick A. Herring, Wappingers; Uldis A. Ziemins, Poughkeepsie, both of N.Y.

[73] Assignee: International Business Machines Corporation, Armonk, N.Y.

[21] Appl. No.: 482,167

[22] Filed: Jun. 7, 1995

Related U.S. Application Data

[63] Continuation of Ser. No. 299,036, Aug. 31, 1994, abandoned, which is a continuation of Ser. No. 923,207, Jul. 31, 1992, abandoned.

[51] Int. Cl.$^6$ .............................. G02B 15/14; G02B 3/10; G02B 9/00; G02B 9/14
[52] U.S. Cl. ..................... 359/691; 359/721; 359/739; 359/789
[58] Field of Search .................... 359/721, 739, 359/784, 785, 789, 790, 793, 794, 691

[56] References Cited

U.S. PATENT DOCUMENTS

| | | | |
|---|---|---|---|
| 1,347,673 | 7/1920 | Bishop | 359/794 |
| 5,087,990 | 2/1992 | Maruyama | 359/794 |
| 5,210,646 | 5/1993 | Mercado et al. | 359/793 |

*Primary Examiner*—William L. Sikes
*Assistant Examiner*—Huy Mai
*Attorney, Agent, or Firm*—Aziz M. Ahsan

[57] ABSTRACT

A variable focus color corrected field lens for accepting rays having a divergence of from 0, wherein the rays are collimated, to a divergence of 10 milliradians full angle and directing the rays to the same point of an optical system. The present lens is corrected for wavelengths from the ultraviolet to the red spectrum of wavelengths for directing the wavelengths to the same point.

24 Claims, 2 Drawing Sheets

| A (MM) | B (MM) | C (MM) | D (MM) | α (DEGREES) |
|---|---|---|---|---|
| 81.0 | 1.0 | 9.5 | 4.734369 | 0.010522 |
| 79.0 | 3.0 | 11.5 | 4.881034 | −0.001572 |
| 77.0 | 5.0 | 13.5 | 5.08148 | −0.013463 |
| 75.0 | 7.0 | 15.5 | 5.337244 | −0.025154 |
| 73.0 | 9.0 | 17.5 | 5.64967 | −0.036643 |
| 71.0 | 11.0 | 19.5 | 6.01993 | −0.04793 |
| 69.0 | 13.0 | 21.5 | 6.44899 | −0.059017 |
| 67.0 | 15.0 | 23.5 | 6.93756 | −0.069902 |
| 62.0 | 20.0 | 28.5 | 8.421872 | −0.096233 |

| RADIUS of Curvature | SURFACE | RADIUS (MM) | THICKNESS (MM) | CLEAR APERTURE (MM) | MATERIAL | REFRACTIVE INDEX 308nm (UV) | REFRACTIVE INDEX 632.8nm (RED) | REFRACTIVE INDEX 587.6nm (GREEN) | ABBE No. (Vd) |
|---|---|---|---|---|---|---|---|---|---|
| R1 | 401 | −125.00 | | 10.5 | | 1.45255 | 1.43289 | 1.43388 | 94.51 |
| R2 | 402 | 47.00 | 3.0 | 10.5 | CaF2 | | | | |
| R3 | 403 | 47.00 | 1.0 MIN. 20.0 MAX. | 9.0 | | 1.48564 | 1.45702 | 1.45846 | 67.80 |
| R4 | 404 | −47.00 | 1.50 | 9.0 | SiO2 | | | | |
| R5 | 405 | −47.00 | 1.00 | 10.5 | | 1.45255 | 1.43289 | 1.43388 | 94.51 |
| R6 | 406 | 125.00 | 3.00 | 10.5 | CaF2 | | | | |

FIG. 2

VARIABLE FOCUS COLOR CORRECTED FIELD LENS

This application is a continuation of application Ser. No. 08/299,036, filed Aug. 31, 1994 now abandoned which is a continuation of application Ser. No. 07/923,207, filed Jul. 31, 1992 now abandoned.

The present invention generally relates to a field lens for capturing and directing rays into an optical system, and more particularly relates to a field lens for capturing and directing rays of more than one wavelength having various angles of divergence to the same point in an optical system.

BACKGROUND OF THE INVENTION

Field lenses are known for preventing vignetting of energy in an optical system. Micro-machining systems utilizing laser beams to machine a workpiece which include field lenses are also known.

SUMMARY OF THE INVENTION

The present invention is a variable focus color corrected field lens for accepting rays having a divergence of from 0, wherein the rays are collimated, to a divergence of 10 milliradians full angle and directing the rays to the same point of an optical system. The present lens is corrected to direct wavelengths from the ultraviolet and the red spectrum of wavelengths and for directing the wavelengths to the same point.

It is an object of the present invention to provide a field lens for directing rays into an optical system wherein the rays may have a diverging incidence angle of from 0 to 10 milliradians full angle.

It is another object of the present invention to provide a field lens which is corrected for two wavelengths of light.

The foregoing and other objects, features and advantages of the invention will be apparent from the following more particular description of the preferred embodiment of the invention as illustrated in the drawings.

BRIEF DESCRIPTION OF THE DRAWINGS

FIG. 2 is a table of the prescription of the variable focus color corrected field lens of FIG. 1.

DESCRIPTION OF THE PREFERRED EMBODIMENT

Figures 1, 3:
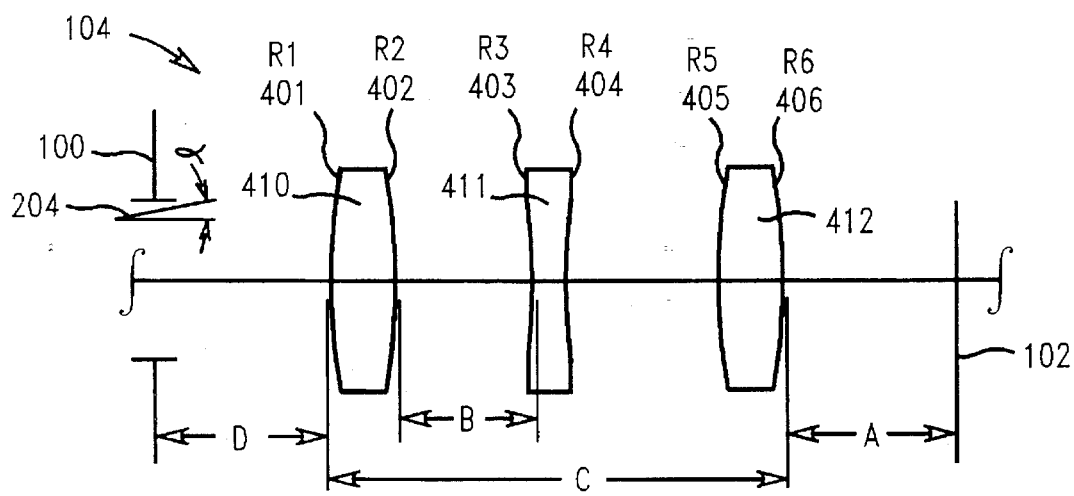
FIG. 1 is a diagram of the variable focus color corrected field lens of the present invention having an image plane and an object plane.
FIG. 3 is a table showing various distances and the angle of divergence of rays incident to the field lens of FIG. 1.

The present invention is a variable focus color corrected field lens for use with a laser micro-machining apparatus such as that disclosed in co-pending U.S. patent application Ser. No. 07/923,284, filed on Jul. 31, 1992, entitled "Variable Magnification Imaging System", owned by the Assignee of the present invention, and the disclosure of which is incorporated herein by reference.

FIG. 1 shows the variable focus color corrected field lens 104 having elements 410, 411 and 412. Element 410 has surfaces 401 and 402, element 411 has surfaces 403 and 404, and element 412 has surfaces 405 and 406. The best mode prescription for each element and its surfaces is shown in FIG. 2. It will be understood that the column marked "thickness" refers to the distance between the present surface and the immediately preceding listed surface. For instance, surface 402 is spaced 3 mm from surface 401.

Element 410 acts as a single element objective lens which projects the image coming through the aperture 100. Elements 411 and 412 form an achromatic lens which interrupts the focusing rays from element 410 and directs them to the image at plane 102, which forms a virtual image within an intercepting optical train. It will be understood that the plane shown at 102 may be, for instance, beyond the entrance to the Barlow lens 106 of FIG. 1 of the aforementioned variable magnification imaging system U.S. patent application Ser. No. 07/923,284.

The achromatic lens formed by elements 411 and 412 are movable with respect to the single element objective lens formed by element 410 to vary the focal length of field the lens 104 and therefore to accommodate a laser beam incident through the aperture 100 with various angles. For instance, a ray 204 through the aperture 100 may have a divergence angle alpha of from 0 to 10 milliradians full angle.

FIG. 3 shows various distances of the field lens 104 and the angle of divergence of the ray 204 incident at the aperture 100. The column labeled A of FIG. 3 is the distance in millimeters from surface 406 of element 412 to the image plane 102 formed within a following optical train. The column labeled B in FIG. 3 shows the distances in millimeters between the surface 402 of element 410 and the surface 403 of element 411. The distance labeled C in FIG. 3 is the distance in millimeters between the surface 401 of FIG. 410 and surface 406 of FIG. 412. The column labeled D is the distance in millimeters between an object, for instance aperture 100, and the surface 401 of FIG. 410 if the object were in focus, and is referred to as the back working distance. The column labeled alpha is the angle of divergence of the ray 204 incident at the aperture 100 in degrees. When the field lens 104 is used in the embodiment shown in FIG. 1 of the aforementioned variable magnification laser imaging system patent application (U.S. Ser. No. 07/923,284), the distance D remains fixed while the distance B is adjusted, thereby changing the distances C to accommodate for varying alpha angles while maintaining the proper location of plane 102.

The variable focus color corrected field lens 104 of the present invention has been designed to correct colors having a wavelength of 308 nanometers and 633 nanometers. This color correction can be achieved with the general shape factors of a biconvex objective and an achromatic lens wherein the elements consist of two materials of dissimilar dispersions. Choice of such materials is known to those skilled in the art. The preferred embodiment accomplishes said color correction relies on the biconvex objective lens and the achromatic lens having the following radii of curvature relationship for any given R2 (it should however be noted that other relationships may exist):

R1=125/47 (−R2), R2=R2, R3=R2, R4=(−R2), R5=(−R2) and R6=(−R1), wherein:
- R1 denotes the radii of curvature of surface 401 of the objective lens 410,
- R2 denotes the radii of curvature of surface 402 of the objective lens 410,
- R3 denotes the radii of curvature of surface 403 of the lens 411,
- R4 denotes the radii of curvature of surface 404 of the lens 411,
- R5 denotes the radii of curvature of surface 405 of the lens 412, and R6 denotes the radii of curvature of surface 406 of the lens 412.

While we have illustrated and described the preferred embodiment of our invention, it is to be understood that we do not limit ourselves to the precise construction herein disclosed, and the right is reserved to all changes and modifications coming within the scope of the invention as defined in the appended claims.

Having thus described our invention, what we claim a new, and desire to secure by Letters Patent is as follows:

1. A variable focus two wavelength color corrected field lens comprising:

a biconvex objective lens which projects an image; and an achromatic lens movable with respect to said biconvex objective lens for directing the image projected from said biconvex objective lens to an image plane, said achromatic lens movement varies the focal length of the field lens and accommodates beams having various angles of incidence.

2. The field lens of claim 1, wherein said biconvex objective lens and said achromatic lens in combination provide for accommodating beams having divergence of between 0 and 10 milliradians full angle.

3. The field lens of claim 2, wherein said biconvex objective lens is a single element lens having a first and a second surface, said biconvex objective lens having the prescription:

| surface | radius (mm) | thickness (mm) | clear aperture (mm) | [glass]material |
|---|---|---|---|---|
| first | −125.00 | | 10.5 | |
| second | 47.00 | 3.0 | 10.5 | $CaF_2$. |

4. The field lens of claim 3, wherein said achromatic lens is a doublet, said doublet having a second element having third and forth surfaces and a third element having fifth and sixth surfaces, said achromatic lens having the prescription:

| surface | radius (mm) | thickness (mm) | clear aperture (mm) | [glass]material |
|---|---|---|---|---|
| third | 47.00 | | 9.0 | |
| forth | −47.00 | 1.5 | 9.0 | $SiO_2$ |
| fifth | −47.00 | 1.00 | 10.5 | |
| sixth | 125.00 | 3.00 | 10.5 | $CaF_2$. |

5. The field lens of claim 4, further comprising an aperture in front of said biconvex objective lens such that the image formed by said biconvex objective lens and projected by said achromatic lens is the image of said aperture.

6. The field lens of claim 1, wherein said field lens provides color correction for two wavelengths, one from the ultraviolet region and the second from the red spectrum region.

7. The field lens of claim 1, wherein wavelengths of 308 nanometers and 633 nanometers are color corrected by said field lens.

8. The field lens of claim 1, wherein said biconvex objective lens and said achromatic lens provide said color correction for UV and Red wavelengths when said lenses have the following radii of curvature relationship:

R1=125/47 (−R2), R2=R2, R3=R2, R4=(−R2), R5=(−R2) and R6=(−R1).

9. A variable focus two wavelength color corrected field lens comprising:

an aperture, an objective lens in the path of said aperture, an achromatic lens, said achromatic lens in the path of said objective lens and movable with respect to said objective lens for directing the image projected from said objective lens to an image plane, wherein the movement of said achromatic lens varies the focal length of the field lens and accommodates beams having various angles of incidence, and thereby forming said variable focus color corrected field lens.

10. The field lens of claim 9, wherein said objective lens and said achromatic lens in combination provide for accommodating beams having divergence of between 0 and 10 milliradians full angle.

11. The field lens of claim 9, wherein said biconvex objective lens and said achromatic lens provide said color correction for UV and Red wavelengths when said lenses have the following radii of curvature relationship:

R1=125/47 (−R2), R2=R2, R3=R2, R4=(−R2), R5=(−R2) and R6=(−R1).

12. The field lens of claim 9, wherein said objective lens is a single element lens having a first and a second surface, said objective lens having the prescription:

| surface | radius (mm) | thickness (mm) | clear aperture (mm) | [glass]material |
|---|---|---|---|---|
| first | −125.00 | | 10.5 | |
| second | 47.00 | 3.0 | 10.5 | $CaF_2$. |

13. The field lens of claim 12, wherein said achromatic lens is doublet, said doublet having a second element having third and forth surfaces and a third element having fifth and sixth surfaces, said achromatic lens having the prescription:

| surface | radius (mm) | thickness (mm) | clear aperture (mm) | [glass]material |
|---|---|---|---|---|
| third | 47.00 | | 9.0 | |
| forth | −47.00 | 1.5 | 9.0 | $SiO_2$ |
| fifth | −47.00 | 1.00 | 10.5 | |
| sixth | 125.00 | 3.00 | 10.5 | $CaF_2$. |

14. The field lens of claim 13, wherein the image formed by said objective lens and projected by said achromatic lens is the image of said aperture.

15. The field lens of claim 9, wherein said field lens provides color correction for two wavelengths, one from the ultraviolet region and the second from the red spectrum region.

16. The field lens of claim 9, wherein wavelengths of 308 nanometers and 633 nanometers are color corrected by said field lens.

17. A process for providing a variable focus two wavelength color corrected field lens comprising the steps of:

a) placing an aperture, b) placing an objective lens in the path of said aperture, c) placing an achromatic lens in the path of said objective lens, wherein said achromatic lens is moveable with respect to said objective lens for directing the image projected from said objective lens to an image plane, wherein the movement of said achromatic lens also allows for the variance of the focal length of the field lens and therefore accommodates beams having various angles of incidence, and d) wherein said objective lens, said aperture and achromatic lens are co-axial and thereby forming said variable focus color corrected field lens.

18. The process of claim 17, wherein said objective lens is a single element lens having a first and a second surface, said objective lens having the prescription:

| surface | radius (mm) | thickness (mm) | clear aperture (mm) | [glass]material |
|---------|-------------|----------------|---------------------|-----------------|
| first   | −125.00     |                | 10.5                |                 |
| second  | 47.00       | 3.0            | 10.5                | $CaF_2$.        |

19. The process of claim 18, wherein said achromatic lens is doublet, said doublet having a second element having third and forth surfaces and a third element having fifth and sixth surfaces, said achromatic lens having the prescription:

| surface | radius (mm) | thickness (mm) | clear aperture (mm) | [glass]material |
|---------|-------------|----------------|---------------------|-----------------|
| third   | 47.00       |                | 9.0                 |                 |
| forth   | −47.00      | 1.5            | 9.0                 | $SiO_2$         |
| fifth   | −47.00      | 1.00           | 10.5                |                 |
| sixth   | 125.00      | 3.00           | 10.5                | $CaF_2$.        |

20. The process of claim 17, wherein the image formed by said objective lens and projected by said achromatic lens is the image of said aperture.

21. The process of claim 17, wherein said field lens provides color correction for two wavelengths, one from the ultraviolet region and the second from the red spectrum region.

22. The process of claim 17, wherein wavelengths of 308 nanometers and 633 nanometers are color corrected by said field lens.

23. The process of claim 17, wherein said biconvex objective lens and said achromatic lens in combination provide for accommodating beams having divergence of between 0 and 10 milliradians full angle.

24. The process of claim 17, wherein said biconvex objective lens and said achromatic lens provide said color correction for UV and Red wavelengths when said lenses have the following radii of curvature relationship:

R1=125/47 (−R2), R2=R2, R3=R2, R4=(−R2), R5=(−R2) and R6=(−R1).

* * * * *